United States Patent
Morisaki

(10) Patent No.: US 6,724,495 B1
(45) Date of Patent: Apr. 20, 2004

(54) MULTI-FUNCTION PERIPHERAL DEVICE AND METHOD FOR PRINTING FROM THE MULTI-FUNCTION PERIPHERAL DEVICE

(75) Inventor: Hiroshi Morisaki, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/263,887

(22) Filed: Mar. 8, 1999

(30) Foreign Application Priority Data

Mar. 13, 1998 (JP) .......................................... 10-062415

(51) Int. Cl.⁷ ................................................. G06K 1/00
(52) U.S. Cl. ...................... 358/1.15; 358/1.16; 358/404
(58) Field of Search ................................. 358/1.1, 1.15, 358/1.13, 1.16, 1.6, 442, 468, 404, 444

(56) References Cited

U.S. PATENT DOCUMENTS 5,663,805 A * 9/1997 Asai ........................... 358/404
5,923,439 A * 7/1999 Tomida et al. ............... 358/404
6,298,404 B1 * 10/2001 Mishra ........................ 358/1.1

FOREIGN PATENT DOCUMENTS

JP          A-7-7597          1/1995

* cited by examiner

*Primary Examiner*—Mark Wallerson
(74) *Attorney, Agent, or Firm*—Oliff & Berridge, PLC

(57) ABSTRACT

A multi-function peripheral device and method for printing from a multi-function peripheral device are presented. When a facsimile function is executed, half of an empty area of a flex memory and a FAX transmission/reception memory are set as a FAX transmission/reception memory. When a printer function is executed, half of an empty area of the flex memory and a printer memory are set as a printer memory. When a printer priority function is executed, all the empty area of the flex memory and the printer memory are set as a printer memory.

18 Claims, 4 Drawing Sheets

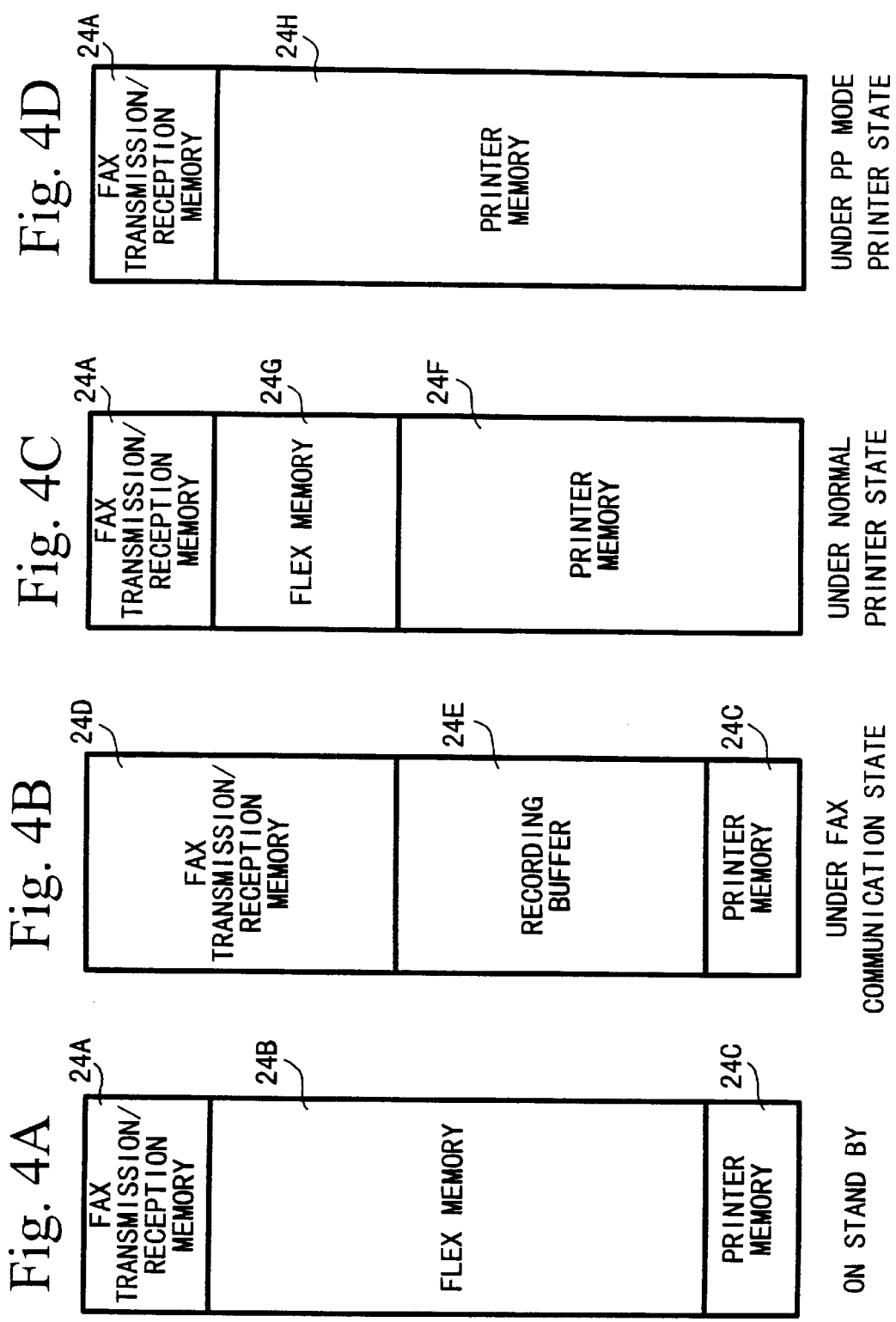

MULTI-FUNCTION PERIPHERAL DEVICE AND METHOD FOR PRINTING FROM THE MULTI-FUNCTION PERIPHERAL DEVICE

BACKGROUND OF THE INVENTION

1. Field of Invention

The invention relates to a multi-function peripheral device having various functions such as a copy function, a facsimile function, a printer function, etc.

2. Description of Related Art

A multi-function peripheral device constructed in such a manner that various functions such as a copy function, a facsimile function, a printer function, etc. are installed and implemented in one device, is well known.

According to the multi-function peripheral device thus constructed, when the device receives a facsimile communication while printing print data transmitted from a computer connected to the multi-function peripheral device, image data received through a telephone line are stored into a memory and then printed on a sheet by a printer. At this time, if a special-purpose sheet for the printer function such as a high-quality sheet for an ink jet printer or an OHP transparent sheet is set for print, the image data received through the facsimile communication are unintentionally printed on this special-purpose sheet. In order to avoid this printing, the multi-function peripheral device is provided with a printer priority function that stores the image data received through the facsimile function into a memory when the printer function is executed and executing the print operation based on the printer function preferentially to the print operation of the image data received through the facsimile communication (Japanese Laid-open Patent Application No. Hei-7-759).

However, even when the printer priority function is executed, the capacity in which the print data can be stored is equal to that when the printer function is executed, so that when the print data input from a computer are high-resolution and complicated print data, all the print data cannot be stored at a time. In this case, it is necessary to input the print data from the computer time at many times. Accordingly, even when the printer priority function is executed, the print output time cannot be shortened.

SUMMARY OF THE INVENTION

The invention overcomes the above problem of the prior art, and has an aspect that provides a multi-function peripheral device with which a memory having a larger capacity than that when a printer function is executed is allowed to be used when a printer priority function is executed and thus a suitable print output can be achieved even when print data input from a computer are high-resolution and complicated.

In order to attain the above aspect, the multi-function peripheral device operates such that when a printer function (first function) is executed, print data are allowed to be stored until the amount of the print data reaches a first storage capacity in any data storage area, and when a priority mode of executing a printer function preferentially is executed, the print data are allowed to be stored until the amount of the print data reaches a second storage capacity larger than the first storage capacity.

According to the above multi-function peripheral device, even when the print data input from a computer are high-resolution and complicated, a large amount of print data at the time the printer function is executed can be stored when the priority mode is executed, thereby avoiding a memory full state. Further, the print data from external devices can be input at any time, and thus the print output time can be reduced.

Furthermore, when a facsimile function (second function) is executed, image data received through a telephone line may be allowed to be stored until the amount of the image data reaches a third storage capacity smaller than the second storage capacity. In this case, when the facsimile function is executed, even a large amount of the image data can be received. In addition, the residual storage capacity of any data storage area can be used as a recording buffer.

The second storage capacity may be set to be substantially all the storage capacity of any data storage area. In this case, the storage capacity for print data input from the computer can be maximized. Therefore, even when the print data are high-resolution and complicated, a full memory state can be avoided, and print data from the external sources can be input at any time, thereby reducing the print output time.

BRIEF DESCRIPTION OF THE DRAWINGS

A preferred embodiment of the present invention will be described in detail with reference to the following figures wherein:

FIGS. 4A–4D are diagrams showing respective use states of a flex memory in the print processing for the facsimile function, the printer function and the printer priority function of the image forming apparatus, wherein FIG. 4A is a diagram under a standby state, FIG. 4B is a diagram under a FAX communication state, FIG. 4C is a diagram under a normal printer state, and FIG. 4D is a diagram under a use state of flex memory in printer priority mode.

DETAILED DESCRIPTION OF PREFERRED EMBODIMENTS

A preferred embodiment according to the present invention will be described with reference to the accompanying drawings.

First, the basic construction of an image forming apparatus of the present invention will be described with reference to FIG. 1.

Figure 1:
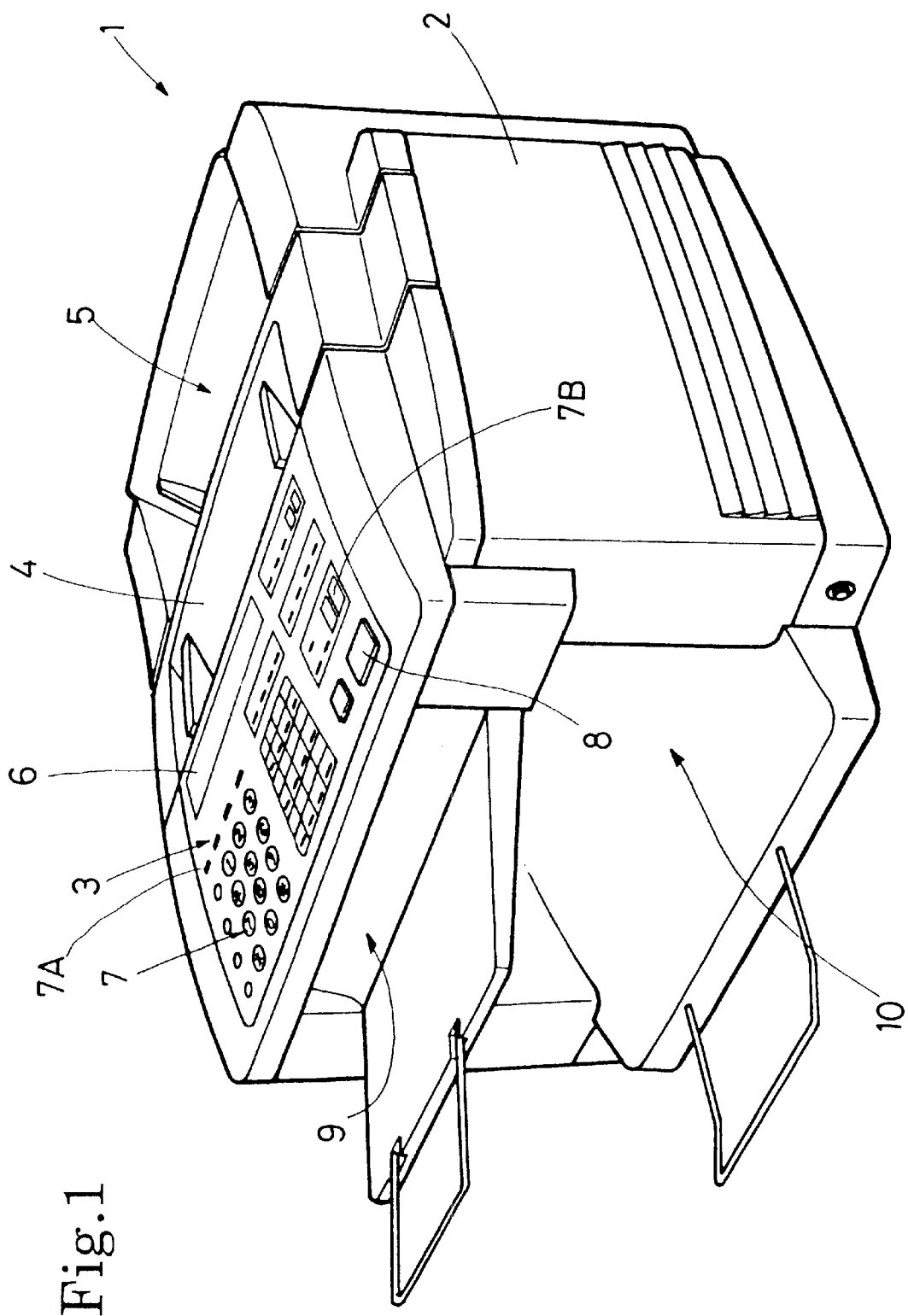
FIG. 1 is a perspective view showing an image forming apparatus according to an embodiment of the present invention.

FIG. 1 is a perspective view showing the image forming apparatus of the present invention.

The image forming apparatus 1 has various functions such as a facsimile function, a copy function, a printer function as a normal printer, an image scanner function, etc.

In FIG. 1, the image forming apparatus 1 has an apparatus body 2. On the top surface of the apparatus body 2 are provided an operation panel 3 having various buttons disposed thereon, an original input portion 4 and a cassette insertion portion 5. A sheet cassette (not shown) accommodates print sheets of each size while the sheets are stacked is inserted and mounted into the cassette insertion portion 5.

An LCD display 6 is located at the upper and left portion of the operation panel 3. Numeric buttons 7 of "0" to "9" and function buttons 7A for selecting respective functions, are disposed at the lower side of the LCD display 6. On the LCD display 6 are displayed various messages such as a telephone number at the execution time of the facsimile function, an operation instruction message at the execution time of the copy or printer function, execution message for each function, etc. The numeric buttons 7 are used to input a telephone number at the execution time of the facsimile machine or input a copy number at the execution time of the copy function. A printer priority button 7B is disposed at the center portion of the right side of the operation panel 3. The printer priority button 7B is pushed at the execution time of the printer function to execute the printer priority function as described below. A function executing button 8 is disposed at the corner of the lower right side of the operation panel 3. The function executing button 8 is pushed when the facsimile transmission or the copy function is executed.

The original input portion 4 is a portion on which a facsimile or a copy original to be transmitted to a transmission destination is input. Each of these originals is fed from the original input portion 4 into the apparatus body 2, and the original data are read out through a reading portion 19 (see FIG. 2). Thereafter, the original is discharged to an original discharge portion 9 provided at the front face side of the apparatus body 2.

Figure 2:
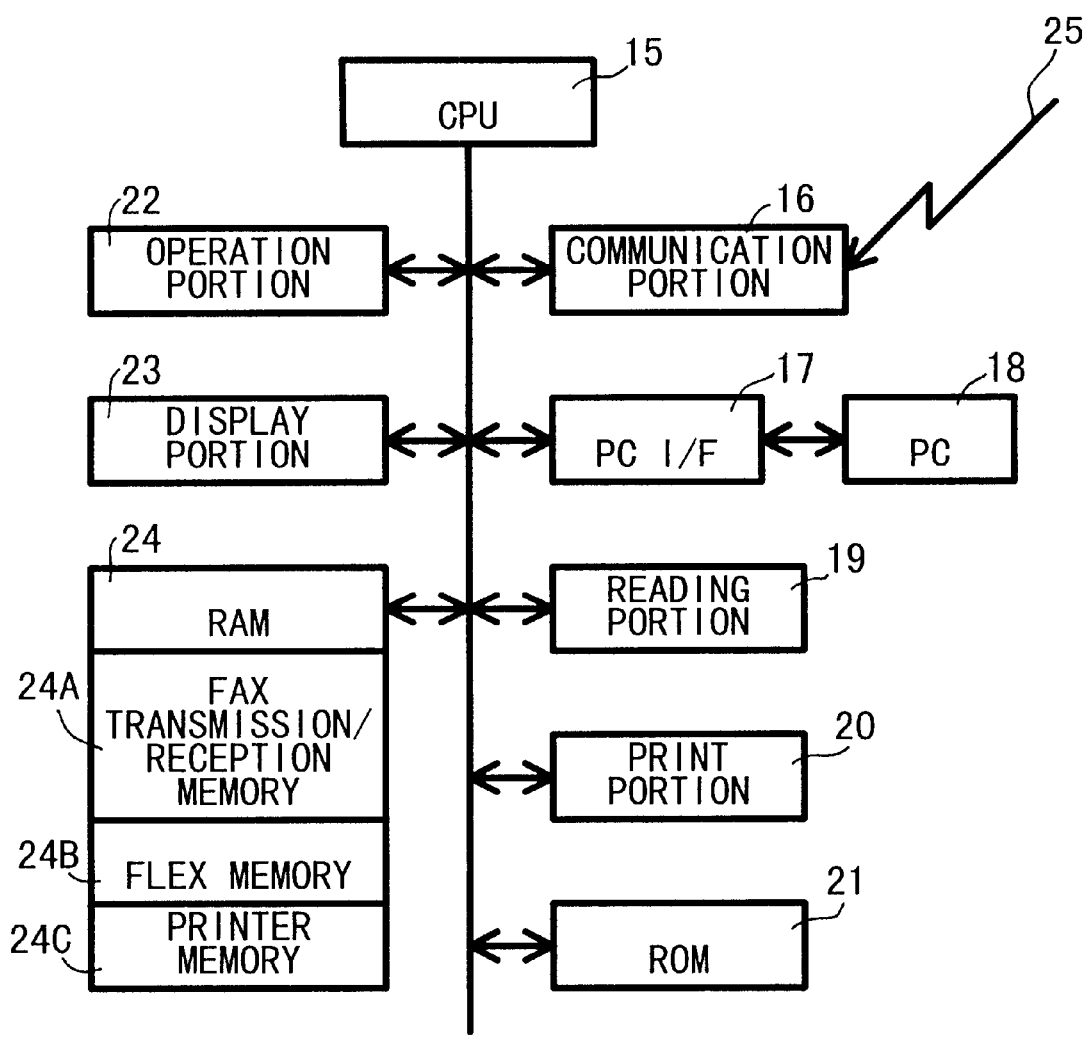
FIG. 2 is a block diagram showing a control system of the image forming apparatus of an embodiment of the present invention.

When the copy function is executed, the original data read out through the reading portion 19 are printed on a print sheet fed from the sheet cassette mounted in the cassette insertion portion 5 by a print portion 20 (see FIG. 2). The print sheet after the original data are printed thereon is discharged to a print sheet discharge portion 10 provided at the lower side of the original discharge portion 9.

An RS232C terminal is provided as an interface 17 (see FIG. 2) for making communications with an external personal computer at the back face portion of the apparatus body 2. The image forming apparatus 1 is connected to the external computer through the interface terminal, and print data to execute the printer function are taken into the image forming apparatus 1 through the interface terminal.

Next, a control system for the image forming apparatus 1 will be described with reference to FIG. 2. FIG. 2 is a block diagram showing the control system of the image forming apparatus 1.

As shown in FIG. 2, the control system of the image forming apparatus 1 includes CPU 15, a computer interface (PC I/F) 17, the reading portion 19, the print portion 20, ROM 21, an operation portion 22, a display portion 23 and RAM 24. The CPU 15, a communication portion 16, the PC interface 17, the reading portion 19, the print portion 20, the ROM 21, the operation portion 22, the display portion 23 and the RAM 24 are connected to one another through a bus line 25. A telephone line 25 is connected to the communication portion 16. A computer 18 is connected to the PC I/F 17. The RAM 24 has a memory 24A used for only FAX transmission/reception as described later, a flex memory 24B and a memory 24C used for only a printer.

The CPU 15 controls the overall image forming apparatus 1 according to a control program stored in the ROM 21. The communication portion 16 comprises NCU (network control unit) and a modem, and is connected to the telephone line 25 to receive/transmit image data. The PC I/F 17 comprises an RS232C interface and communicates print data with PC 18 connected thereto. The reading portion 19 reads out an image recorded on an original taken from the original input portion 4, and outputs the image data as digital data. The print portion 20 comprises an ink jet type head, and selectively jets ink drops from an ink jet port formed in the ink jet type head to print image data or print data. As the print portion 20 may include various devices, such as a device based on the well-known electrophotographic technology, a device that transfers ink onto a print sheet with a thermal transfer ribbon, a device that heats a thermally-sensitive sheet in accordance with image data or print data to print the data on the sheet, etc.

The ROM 21 is a memory for storing various programs needed to control the image forming apparatus, which includes a printer priority processing program as described below, etc. The operation portion 22 comprises the numeric buttons 7, the printer priority button 7B, etc., and inputs various operation instructions, etc. The display portion 23 comprises the LCD display 6 and a controller for controlling the LCD display 6 and displays the status of the apparatus. The RAM 24 is a memory for temporarily storing various data calculated through the CPU 15, image data received, print data input from external devices, etc. The FAX transmission/reception memory 24A constitutes a memory which is used only when the facsimile function is executed. The flex memory 24B constitutes any data storage area in which the image data and the print data can be stored, as described below. The printer memory 24C is a memory which is used only when the printer function is executed.

Next, the printing process when each of the facsimile function, the printer function and the printer priority function is executed in the image forming apparatus 1 will be described with reference to FIGS. 3 and 4.

Figure 3:
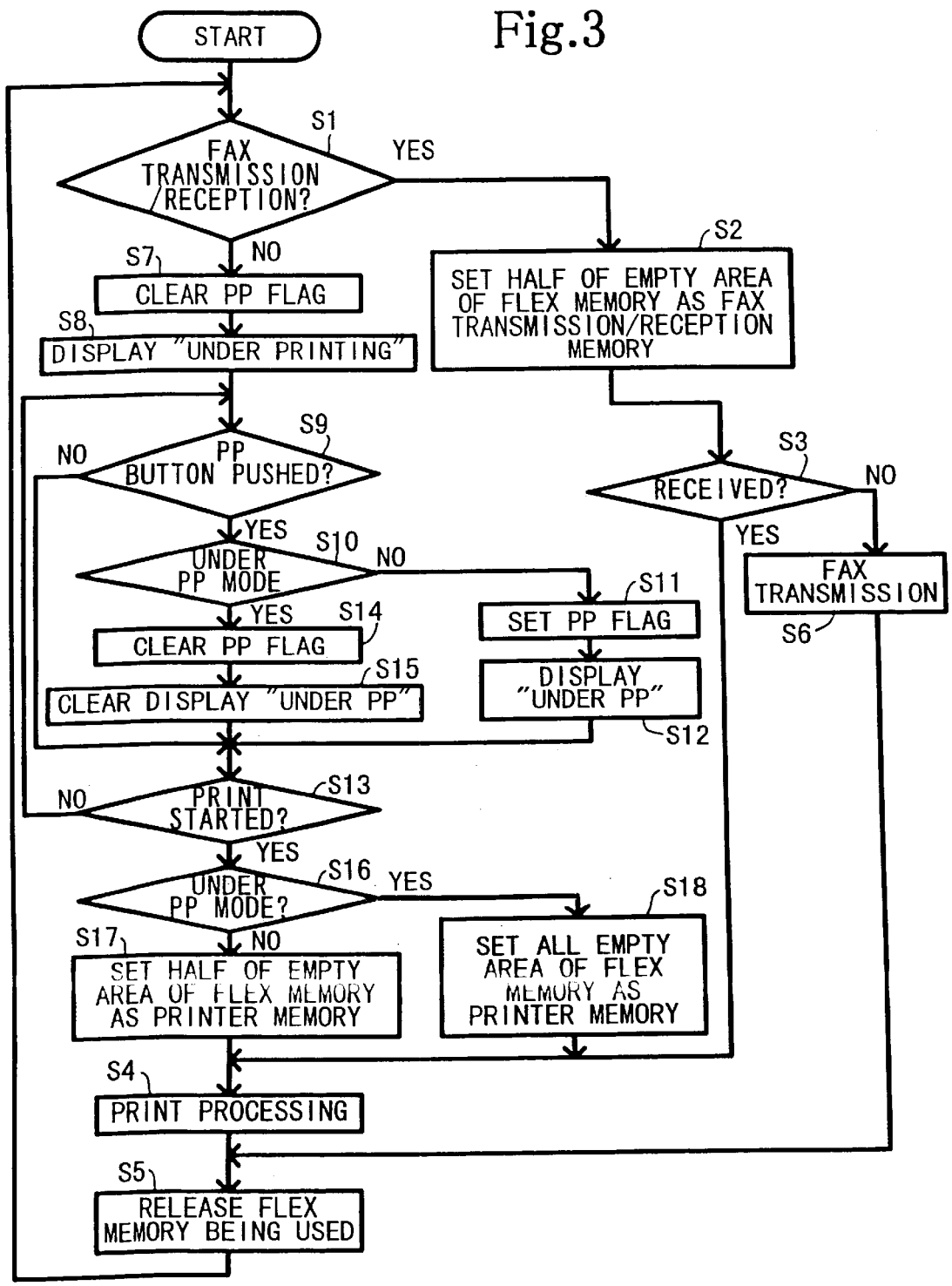
FIG. 3 is a flowchart showing the print processing for a facsimile function, a printer function and a printer priority function of the image forming apparatus.

FIG. 3 is a flowchart showing the printing process when each of the facsimile function, the printer function and the printer priority function according to this embodiment is executed. FIGS. 4A–4D are diagrams showing the use status of the flex memory 24B in the printing process when each of the facsimile function, the printer function and the printer priority function according to this embodiment is executed. FIG. 4A is a diagram describing a standby state, FIG. 4B is a diagram describing a FAX communication state, FIG. 4C is a diagram describing a normal printer state, and FIG. 4D is a diagram describing a state when the flex memory is used when the printer priority mode is executed.

First, as shown in FIG. 3, it is determined in S1 whether the facsimile function is executed. At this time, the RAM 24 is on standby as shown in FIG. 4A. The RAM 24 is divided into three memory areas including the FAX transmission/reception memory 24A, the flex memory 24B and the printer memory 24C. The area of the flex memory 24B is largest.

If the facsimile function is executed (S1:YES), a half of an empty area of the flex memory 24B is set as the FAX transmission/reception memory 24D (S2). The state of the RAM 24 at this time is shown in FIG. 4B. The flex memory 24B under the standby state is divided into two areas, one of which is set as another FAX transmission/reception memory 24D together with the FAX transmission/reception memory 24A. The residual half of the flex memory 24B is set as a recording buffer 24E. The recording buffer 24E is used as a recording buffer for received image data for the printing operation and as a memory buffer for the transmission of image data. The printer memory 24C is kept on standby.

The judgment of S1 as to whether the facsimile function is executed can be implemented by determining whether the communication portion 16 receives a call through a communication line or whether an original input to the original input portion 4 and an instruction for the facsimile transmission is made.

If a facsimile communication is received (S3:YES), image data received are temporarily stored in the FAX transmission/reception memory 24D. The image data thus recorded are printed on a print sheet by the print portion 20 while the recording buffer 24E is used (S4). When the print processing is completed, the FAX transmission/reception memory 24D and the recording buffer 24E are released. Since the image forming apparatus 1 is on standby, the state of the RAM 24 is set to the standby state shown in FIG. 4A, and the FAX transmission/reception memory 24A and the flex memory 24B are set (S5). Thereafter, the processing of all the steps from S1 is executed again.

If a facsimile communication is transmitted (S3:NO), an image recorded on an original put on the original input portion 4 is read out by the reading portion 19. The image data thus read are temporarily stored in the FAX transmission/reception memory 24D, and then transmitted from the communication portion 16 through the telephone line 25 according to a well-known facsimile communication protocol.

If the facsimile function is not executed (S1:NO), a printer priority flag (hereinafter referred to as "PP flag") is read out from the RAM 24, and zero is substituted into the PP flag. Thereafter, the PP flag is stored into the RAM 24 again (S7). Subsequently, "under execution of printer" is displayed on the LCD display 6 to indicate that the normal printer function is being executed (S8).

Subsequently, it is determined whether the printer priority button for instructing the execution of the printer priority function has been pushed (S9). If the printer priority button 7B has not been pushed (S9:NO), the processing of the steps from S13 is executed.

If the printer priority button 7B has been pushed (S9:YES), the PP flag is read out from the RAM 24 to determine whether it is set to "0" or "1" (S10). If the PP flag thus read is set to "0" (S10:NO), that is, if the current mode has not yet been set to the printer priority mode in which the printer priority function is executed, "1" is substituted into the PP flag, and then stored into the RAM 24 (S11). At this time, "under PP" is displayed on the LCD display 6 to indicate that the current mode is set to the printer priority mode in which the printer priority function is executed (S12).

If the PP flag thus read is "1" (S10:YES), that is, the current mode is the printer priority mode, "0" is substituted into the PP flag and stored into the RAM 24 (S14). That is, the printer priority mode is released. The display of "under PP" on the LCD display 6 is cleared, and "under execution of printer" is displayed to indicate that the normal printer function is being executed.

Subsequently, it is determined whether a print start command is input from PC 18 through the interface 17 (S13). If no print start command is input (S13:NO), the processing of the steps from S9 is executed again. If the print start command is input from PC 18 through the interface 17 (S13:YES), the PP flag is read out from the RAM 24 again and it is determined whether the PP flag thus read is set to "1" or "0" (S16). If the PP flag thus read is set to "0" (S16:NO), that is, if the current mode is not the printer priority mode, the processing program at the execution time of the printer function is read out from the ROM 21, and a half of an empty area of the flex memory 24B is set as a printer memory 24F according to the program (S17).

Specifically, as shown in FIG. 4C, a half of an empty area of the flex memory 24B and the printer memory 24C are set as the printer memory 24F. Further, the residual half of the empty area of the flex memory 24B is directly used as a flex memory 24G. The FAX transmission/reception memory 24A is left as it is.

Print data which are input from PC 18 and then stored in the printer memory 24F are printed on a print sheet by the print portion 20 (S4). When the print processing is completed, the printer memory 24F and the flex memory 24G are released, and they are set to the original flex memory 24B and the original printer memory 24C (S5). Thereafter, the processing of the steps from S1 is executed again.

If the PP flag thus read is "1" (S16:YES), that is, the current mode is the printer priority mode, the processing program of the printer priority function is read out, and all the empty area of the flex memory 24B is set as a printer memory 24H according to the processing program (S18). Specifically, as shown in FIG. 4D, all the empty area of the flex memory 24B and the printer memory 24C are set as the printer memory 24H. The FAX transmission/reception memory 24A is left as it is.

The print data input from PC 18 are temporarily stored in the printer memory 24H, and then printed on a print sheet by the print portion 20 (S4). When the printing process is completed, the printer memory 24H is released, and it is set to the original flex memory 24B and the original printer memory 24C (S5). Thereafter, the processing of the steps from S1 is executed again.

In the image forming apparatus 1 according to the above embodiment, as shown in FIG. 4B, half of the empty area of the flex memory 24B is set as the FAX transmission/reception memory 24D, and the other residual half of the empty area is set as the recording buffer 24E when the facsimile function is executed. Further, as shown in FIG. 4C, when the printer function is executed, a half of the empty area of the flex memory 24B is set as the printer memory 24F, and the residual half of the empty area is set as the flex memory 24G. Still further, when the mode is set to the printer priority mode, all the empty area of the flex memory 24B is set as the printer memory 24H.

Accordingly, the flex memory 24B is used when any one of the facsimile function, the printer function and the printer priority function is executed, so that the use efficiency of the memory is enhanced and the storage capacity can be apparently increased.

In the case of the printer priority mode, all the empty area of the flex memory 24B is set as the printer memory 24H. Accordingly, even when the print data input from PC 18 are high-resolution and complicated, a larger amount of print data can be stored than when the normal printer function is executed. Therefore, the fall memory state can be avoided. In addition, the print data from PC 18 can be input at any time, and thus the print output time can be reduced.

Further, by setting half of the empty area of the flex memory 24B as the recording buffer 24E when the facsimile function is executed, the printing process can be efficiently performed.

When a facsimile communication is received after the print portion 20 starts to print print data according to the print start command received from PC 18, the image data thus received are stored in the FAX transmission/reception memory 24A and the flex memory 24G shown in FIG. 4C. After the printing operation of the print data transmitted from PC 18 is completed, the image data stored in the FAX transmission/reception memory 24A and the flex memory 24G are output and printed by the print portion 20.

Likewise, when a facsimile communication is received in the printer priority mode, the image data received are stored in the FAX transmission/reception memory 24A shown in FIG. 4D, output, and printed by the print portion after the printer priority mode is released.

The invention is not limited to the above embodiment, and various improvements and modifications may be made without departing from the subject matter of the present invention.

For example, if a time zone in which facsimile transmission/reception is rare is previously known, there may be used a manner of setting a timer or the like and automatically setting the flex memory 24B to the printer priority mode executing state when a predetermined time is reached. According to this manner, the print job can be efficiently performed.

What is claimed is:

1. A multi-function peripheral device, comprising:
    a memory for storing received image data and print data, the memory comprising:
        a first storage section for print data;
        a second storage section for print and received image data; and
        a third storage section for received image data; and
    a printer that prints image data and print data stored in the memory onto a print medium, the multi-function peripheral device being provided with a priority mode in which a first function of printing the print data has priority over a second function of printing the received image data, wherein when the first function is executed, print data are allowed to be stored until the amount of the print data fills the first storage section in the memory, and when the priority mode is executed, the print data are allowed to be stored until the amount of the print data fills the first and the second storage sections.

2. The multi-function peripheral device as claimed in claim 1, wherein when the second function is executed, the image data are allowed to be stored until the amount of the image data fills the third storage section and the second storage section.

3. The multi-function peripheral device as claimed in claim 1, wherein the combination of the first, second, and third storage sections is equal to substantially all the storage capacity of the memory.

4. The multi-function peripheral device as claimed in claim 1, wherein the print data is input from external devices.

5. A method of printing data from a multi-function peripheral device, comprising:
    storing print data in a first storage section;
    storing received image data and print data in a second storage section;
    storing received image data in a third storage section; and
    printing stored image data and print data onto a print medium, the multi-function peripheral device being provided with a priority mode in which a first function of printing the print data has priority over a second function of printing the received image data, wherein when the first function is executed, print data are allowed to be stored until the amount of the print data fills the first storage section, and when the priority mode is executed, the print data are allowed to be stored until the amount of the print data fills the first and the second storage sections.

6. The method of printing data as claimed in claim 5, wherein when the second function is executed, the image data are allowed to be stored until the amount of the image data fills the third storage section and the second storage section.

7. The method of printing data as claimed in claim 5, wherein the combination of the first, second, and third storage sections is equal to substantially all of the available storage capacity.

8. The method of printing data as claimed in claim 5, wherein the print data is input from external devices.

9. A storage medium for storing programs for printing data from a multi-function peripheral device, comprising:
    a memory for storing received image data and print data, the memory comprising:
        a first storage section for print data;
        a second storage section for print and received image data; and
        a third storage section for received image data; and
    a program for printing image data and print data stored in the memory onto a print medium, the multi-function peripheral device being provided with a priority mode in which a first function of printing the print data has priority over a second function of printing the received image data, wherein when the first function is executed, print data are allowed to be stored until the amount of the print data fills the first storage section in the memory, and when the priority mode is executed, the print data are allowed to be stored until the amount of the print data fills the first and second storage sections.

10. The storage medium as claimed in claim 9, wherein when the second function is executed, the image data are allowed to be stored until the amount of the image data fills the third storage section and the second storage section.

11. The storage medium as claimed in claim 9, wherein the combination of the first, second, and third storage sections is equal to substantially all the storage capacity of the memory.

12. The storage medium as claimed in claim 9, wherein the print data is input from external devices.

13. A multi-function peripheral device, comprising:
    a memory that includes a first storage section, a second storage section that stores facsimile data for reception/transmission, and a third storage section that stores print data for printing;
    a printer that prints image data and print data stored in the memory onto a print medium, wherein when a facsimile function is executed, half of an empty area of the first storage section and the second storage section are set as a facsimile transmission/reception memory.

14. The multi-function peripheral device as claimed in claim 13, wherein when a printer function is executed, half of an empty area of the first storage section and the third storage section are set as a printer memory.

15. The multi-function peripheral device as claimed in claim 13, wherein when a printer priority function is executed, all the empty area of the first storage section and the third storage section are set as a printer memory.

16. The multi-function peripheral device as claimed in claim 13, wherein the storage capacity of the first memory section is greater than the third memory section.

17. The multi-function peripheral device as claimed in claim 13, wherein the combination of the first, second, and third storage sections is equal to substantially all the storage capacity of the memory.

18. The multi-function peripheral device as claimed in claim 13, wherein the print data is input from external devices.

* * * * *